Dec. 29, 1970 A. VACCARO ET AL 3,551,887

CHARACTER READING APPARATUS

Filed Dec. 12, 1967 3 Sheets-Sheet 1

INVENTORS
Angelo Vaccaro
BY Harold F.E. Dixon

Johnson and Kline
ATTORNEYS

CHARACTER READING APPARATUS

Filed Dec. 12, 1967 3 Sheets-Sheet 2

INVENTORS
Angelo Vaccaro
Harold F.E. Dixon
BY Johnson and Kline
ATTORNEYS

CHARACTER READING APPARATUS
Filed Dec. 12, 1967 3 Sheets-Sheet 3
Fig. 5
| CHARACTER NUMBER | LOWER READING LINE (SHIFT REGISTER) | UPPER READING LINE (SHIFT REGISTER) |
|---|---|---|
| 0 | 1 0 0 0 1 | 1 0 0 0 1 |
| 1 | 0 0 1 0 1 | 0 0 1 0 0 |
| 2 | 1 0 0 0 0 | 0 0 0 0 1 |
| 3 | 0 0 0 0 1 | 0 0 0 0 1 |
| 4 | 0 0 0 0 1 | 0 1 0 0 1 |
| 5 | 0 0 0 0 1 | 0 1 0 0 0 |
| 6 | 0 0 0 0 1 | 1 0 0 0 0 |
| 7 | 0 0 1 0 0 | 0 0 0 0 1 |
| 8 | 1 0 0 0 1 | 0 1 0 1 0 |
| 9 | 1 0 0 0 0 | 1 0 0 0 1 |
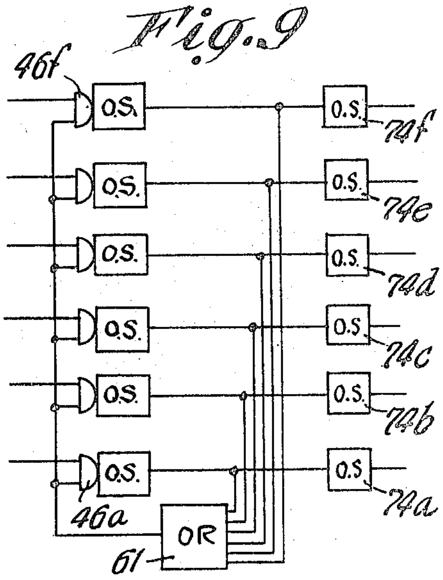
Fig. 9
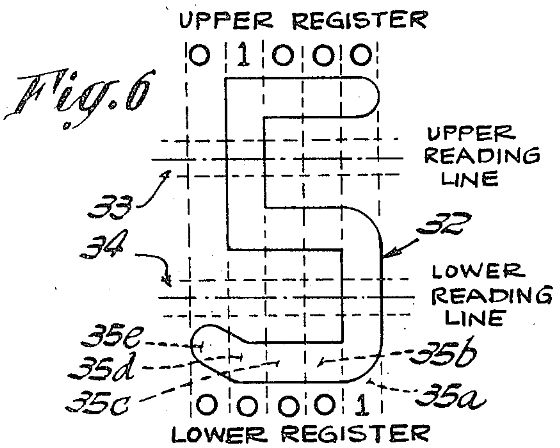
Fig. 6
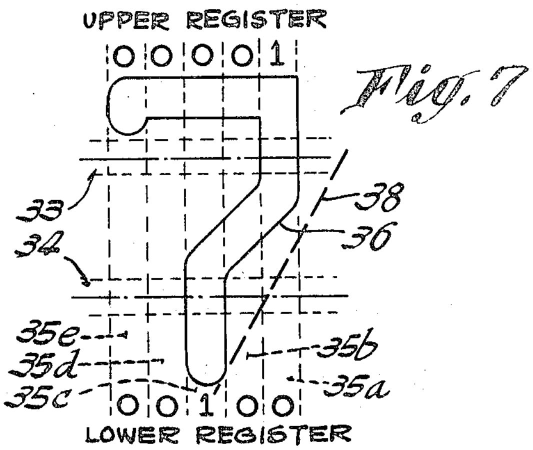
Fig. 7
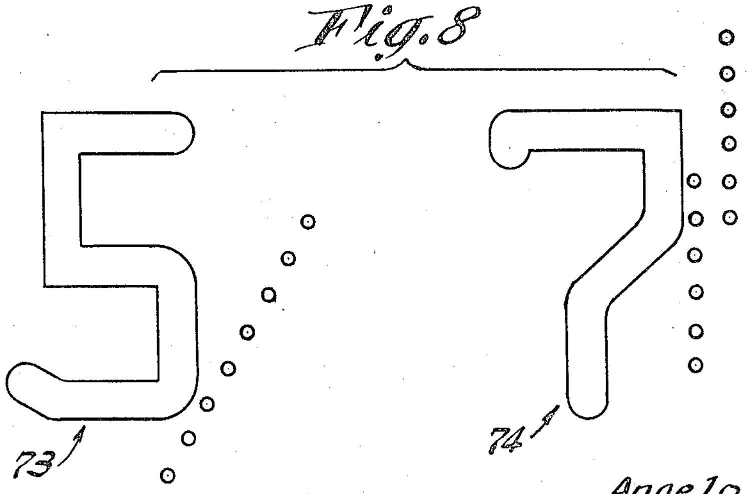
Fig. 8
INVENTORS
Angelo Vaccaro
BY Harold F.E. Dixon
Johnson and Kline
ATTORNEYS United States Patent Office 3,551,887
Patented Dec. 29, 1970

3,551,887
CHARACTER READING APPARATUS

Angelo Vaccaro, Port Washington, and Harold F. E. Dixon, Douglaston, N.Y., assignors to Columbia Controls Research Corporation, Glen Cove, N.Y., a corporation of New York Filed Dec. 12, 1967, Ser. No. 689,841
Int. Cl. G06r 9/04
U.S. Cl. 340—146.3 8 Claims

ABSTRACT OF THE DISCLOSURE

A character reading apparatus that has a plurality of vertically aligned and spaced reading elements and a plurality of sequentially actuatable registering elements with the leading edge of a character to be read initially actuating the first registering element which then selects certain ones of the reading elements that are to be employed to provide the character scan signals that are then translated into an output signal unique to the character.

The apparatus of the present invention has particular utility when employed to read characters which are so configurated as to normally be incapable of being read by a single reading element that is responsive to the total height of the character. In such a single reading member, its reading length is longer than the height of the character and vertical misalignment between it and the characters is inconsequential so long as the characters are still within the reading length of the reading member. However, with characters having another type of font, such as the USA standard character set for optical character recognition, a single vertical slit reading element is incapable of providing a read or scan signal for each character that is different from each other character and hence a single reading element is not usable with characters having such a font because it does not provide a read signal which can be translated into an output signal unique to each character.

It has been found, however, that if two reading elements are employed to read this font of characters, especially numbers, that the combination of the read signals from each reading element will provide a sum signal that is unique to each character for all the numerical characters. One reading element is located to read through a horizontal segment of the upper portion of the character and the other reading element is set to also read through a horizontal segment but in the lower portion of the character. Each horizontal segment is required to be located at selected locations in each portion of the character and a substantial deviation therefrom will introduce error into the reading. If each character is not accurately positioned with respect to the reading elements which may be caused by sequential characters not being exactly horizontally aligned with each other in a row of characters and/or if the row is not accurately printed on the printed medium with respect to a locating edge, then the reading elements will deviate from the selected locations and produce error.

It is accordingly an object of the present invention to provide a character reading apparatus which is capable of errorlessly reading characters by two reading elements even though the characters are not all horizontally aligned and/or the row of characters is not precisely located on the printed medium.

Another object of the present invention is to provide a character reading apparatus which achieves the above recited object but yet which is extremely simple in construction and composed of relatively inexpensive components.

A further object of the present invention is to provide a plurality of reading elements that are vertically spaced with respect to the path of movement of the character and to cause only the reading elements which are aligned with the selected locations on the upper and lower portions to provide the read signals which are translated into an output signal unique to the character.

In carrying out the present invention, the apparatus includes a plurality of reading elements which are spaced apart and positioned transversely of the path of movement of the character to extend across the path a width greater than the height of the characters. Positioned prior to the reading elements in the path is a plurality of registering elements such that a character to be read initially encounters the registering elements and then subsequently is scanned by the reading elements. There are a plurality of registering elements with each registering element being connected to actuate a pair of the reading elements. The read signals from the actuated reading elements are translated into the unique signal representative of the character read. The actuated pair of reading elements are spaced transversely of the path of the character so that one reading element will read the horizontal segment on the upper portion of the character and the other reading element will read the horizontal segment on the lower portion of the character.

The registering elements are positioned so that they not only extend transversely of the path of movement of the character, i.e. vertically thereof, but also are positioned to extend parallel with the path of movement. Thus when the character in its movement comes into position to be scanned by the registering elements, the leading edge of the character will cause the registering elements to be sequentially actuated by those that are in position to scan the character. At any vertical location of the character within the vertical range of the registering elements, there will be at least one registering element that will be actuated and if more than one is actuated, they will be actuated sequentially.

The signal from the first actuated registering element is used by the apparatus to select which pair of reading elements are to supply the read signals. After this selection, the apparatus prevents any other actuated registering elements from actuating its reading elements so that the only character reading information supplied the remainder of the apparatus is that from the actuated pair.

The character read signals from the two actuated reading elements may, when the apparatus as herein described is an optical reading system, depend upon the response of photoresponsive members to changes in light reflectivity along the horizontal segment scanned by each. Thus the signals consist of either a high or low voltage level condition and may, when the reading element senses the white background material of the character bearing medium, be high while, when the reading element senses or scans a black portion of the printed character, be low. The voltage level of the reading element is utilized to set the state of a flip-flop to a state that corresponds to the voltage level. This flip-flop in the specific embodiment hereinafter described constitutes the initial stage of a plural stage shift register.

For transferring the state of the initial stage of the shift register to subsequent stages, the leading edge of the character is caused to operate a clock that produces five pulses which are timed to occur when selected vertical sections of the character are being scanned by the reading elements. Thus, the clock effectively divides the horizontal segments of the character into five vertical sections and causes the condition (i.e. the flip-flop stage) of the reading element for each section to be stored in its shift register. As there are five clock pulses and as both the upper reading element and the lower reading element have their own shift register, there is produced a binary code of five bits in each register. The bits in the upper shift register and the bits in the lower shift register when combined provide a different representation for each numerical character. The bits if desired may be decoded into a conventional binary representation or a decimal representation of the character.

Other features and advantages will hereinafter appear.

In the drawing:

FIG. 5 is a chart of the numerical characters and the binary representation which each produces when read in the upper and lower shift registers.

FIG. 6 is a view of the character 5 together with the binary representation for each of its vertical sections together with an indication of the horizontal sections where the character is scanned by the reading elements.

FIG. 7 is similar to FIG. 6 for the numerical character 7.

FIG. 8 is a view of a modification wherein the registering elements sense one character while the reading elements are reading a different character, thus enabling the registering elements and reading elements to be further spaced along the path of movement of the characters.

FIG. 9 is a circuit diagram showing the additional components required in the circuit in order to perform scanning in the modification shown in FIG. 8.

Figure 1:
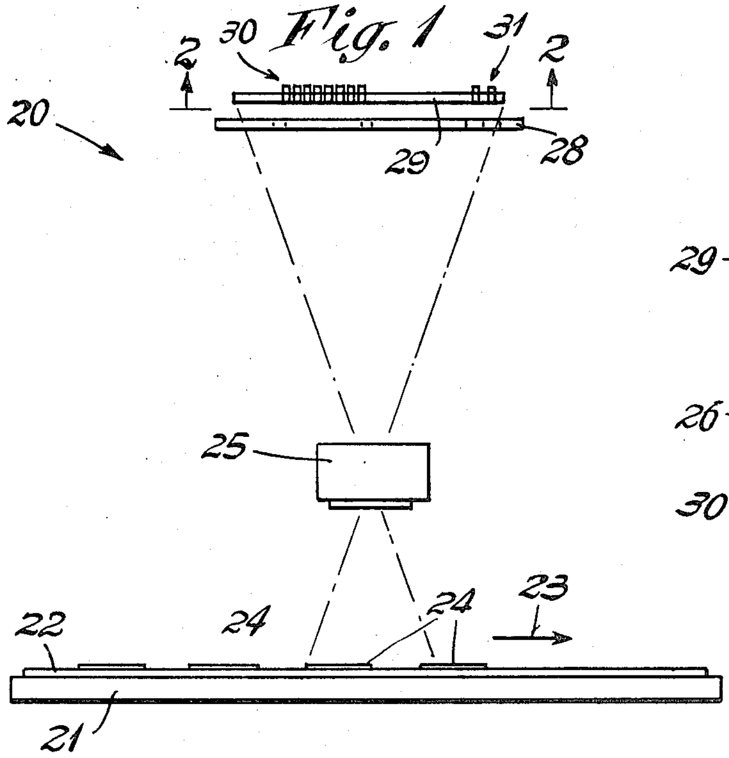
FIG. 1 is a diagrammatic representation of the scanning portion of the apparatus of the present invention together with characters (somewhat enlarged) formed on a medium that are to be read.
Figure 2:
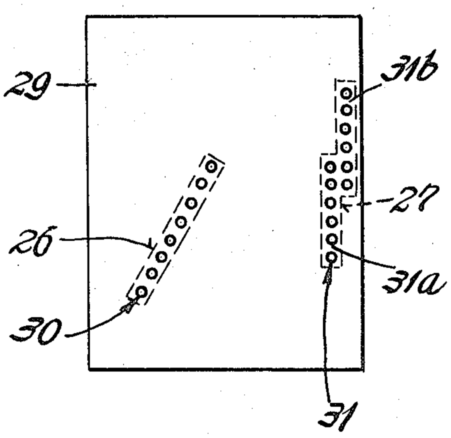
FIG. 2 is a view taken on line 2—2 of FIG. 1 showing the relative disposition of the scanning elements.

Referring to the drawing, the apparatus of the present invention is generally indicated by the reference numeral 20 and includes a support 21 on which or by which a medium 22, such as a piece of paper or a card, is caused to be moved in the direction of the arrow 23 at a predetermined rate. The support may be a bed as shown or a plurality of pinching rollers if desired. Imprinted or otherwise formed on the medium 22 is a plurality of characters 24 which are shown in FIG. 1 somewhat exaggerated in thickness. The medium 22 is located with respect to the apparatus so that the characters are caused to be moved in a path beneath a lens 25 which produces an enlarged image of the character through registering slit 26 and a reading slit 27 formed in an otherwise opaque plate 28. The plate 28 is positioned between the lens 25 and an element holder 29 so that the light impinging upon the adjacent surface of the holder is that portion of the image which passes through the two slits 26 and 27.

The holder 29 contains, as in apertures, a first plurality of photo-responsive cells 30 and a second plurality of photo-responsive cells 31. The cells 30 constitute registering elements while the cells 31 constitute reading elements. It will be understood that the registering cells 30 extend transversely to the path of movement of the character at an angle which may be perhaps 60° to the path while the cells 31 are formed into two parallel rows 31*a* and 31*b* that are aligned substantially perpendicular to the path of movement.

The registering elements 30 are positioned and number in quantity so as to have a transverse height perpendicular to the path which is normally less than the height of a character. The first row of cells 31*a* has a quantity of cells whose total may also be less than the height of a character as is true of the number of cells in the row 31*b*. The two rows 31*a* and 31*b* are displaced slightly along the path of movement of the character in order to enable more than one cell to be located in the same parallel line of movement of the character for reasons which will be hereinafter understood.

Referring to FIG. 6, there is shown a numerical character 5 having a configuration which corresponds to the USA specifications and is indicated by the reference numeral 32. The present invention utilizes one of the reading elements in the row 31*b* to scan or read the character in the horizontal path of movement segment 33 indicated in the drawing as the "upper reading line," while one of the reading elements in the row 31*a* reads the character along a "lower reading line," indicated by the reference numeral 34.

In reading the character, the apparatus effectively divides the character or the area in which the maximum width character of the set may be outlined into five vertical portions denoted 35*a*, 35*b*, 35*c*, 35*d* and 35*e*. Each of the reading elements that is continuously scanning along the reading lines has one condition or voltage level when a portion of the character is scanned and another condition and voltage level when the background or surface of the medium 22 is scanned. The apparatus stores the condition of the reading elements caused by the presence or absence of a part of the character in each portion along the upper reading line 33 and the lower reading line 34. Specifically with the numerical character 5, the character is basically read or scanned from right to left and thus in the first vertical portion 35*a*, the upper reading cell senses a white or background area while the lower reading cell senses a dark area or part of the character. In the binary representation of the apparatus, the former is indicated by the binary notation 0 and thus a 0 is placed on the drawing above and vertically aligned with the vertical portion 35*a*. The scanning of the dark part by the lower reading element provides a 1 state and this is shown in FIG. 6 below and vertically aligned with the segment 35*a*. For the other segments, the reading element scanning along the upper reading line will produce the binary notation above and vertically aligned therewith, namely 01000 while the lower reading element will produce the binary notation 00001 that is positioned below the character.

In FIG. 7 the same vertical portions 35*a* through 35*e* subdivide the numerical character 7 (indicated by the reference numeral 36) and are shown as are also the upper reading line 33 and the lower reading line 34. Vertically aligned with the portions of the character located at its top and bottom are the binary notations produced by this character and thus for the upper reading element, the binary notation 00001 is produced by scanning while the lower reading element produces the notation 00100.

In the set of USA optical characters, the width or thickness of each stroke of each character is set forth as having a standard dimension while the total width of the character is a multiple of the stroke dimension. Generally this width is about four times the stroke thickness from the center line of the leading stroke to the center line of the trailing stroke and thus any changes in the character of substantial magnitude (excluding small radii) will occur at the borders of the vertical portions 35*a* through 35*e* which are essentially equal to the width of a stroke. This is especially true of changes that occur in the configuration of the character along both reading lines.

The chart, FIG. 5, sets forth each of the numerical characters that constitutes a numeral in this system and horizontally aligned therewith is the binary notation for both the upper reading element and the lower reading element. From the chart it will thus be seen that if each of the numerals is read along the reading lines 33 and 34 that a binary notation for each will be obtained that is different from any other character and unique to its character when the information from the two reading elements is combined.

It will also be understood that if the upper reading line or the lower reading line 34 failed to sense that portion of the character which it must in order to produce to the binary representation of the character, that error will be introduced to the apparatus and the number read incorrectly. In accordance with the present invention, the registering elements, the first plurality of elements 30 are utilized to select the reading element in the lower row 31*a* that is most nearly aligned with the lower reading line 34 and also the reading element in the row 31*b* that is similarly aligned with the upper reading line 33. After this selection, only the two reading elements most nearly aligned are permitted to transmit read or scan signals to the remainder of the apparatus wherein these read signals are translated to the binary representation of the number to provide the output signal unique to the number.

It has also been discovered that each of the USA characters, at least the numerals, has a bottom portion that is a set distance from the lower reading line. By the bottom portion of every character being scanned first by the registering elements, then the reading elements will be known to have to be positioned a selected distance from the first actuated registering element. The present invention utilizes this discovery by placing the registering elements inclined to the path of movement of the character so that the leading edge of the bottom stroke thickness, indicated in FIG. 3 by the reference numeral 37, a cross hatched area, will be the first edge of the character to cause a response in one of the registering elements 30. Thus, no matter where the bottom stroke thickness 37 occurs within the capabilities or vertical range of the registering elements, namely its transverse width, the bottom thickness will be sensed first by the registering element aligned with it. The other edges of the character which constitute its leading edge, will then subsequently be scanned by the registering elements as the character is moved with respect thereto. However, use is not presently made in the present system of the sequential scanning by the other registering elements.

The angle with which the registering elements 30 are inclined with respect to the path of movement of the character is such that even with the numeral 7 of the character set, as shown in FIG. 7, the bottom stroke thickness thereof will be sensed prior to the sensing of any other part of the leading edge of the character. The inclination of the registering elements is indicated by the dotted line 38.

Figure 3:
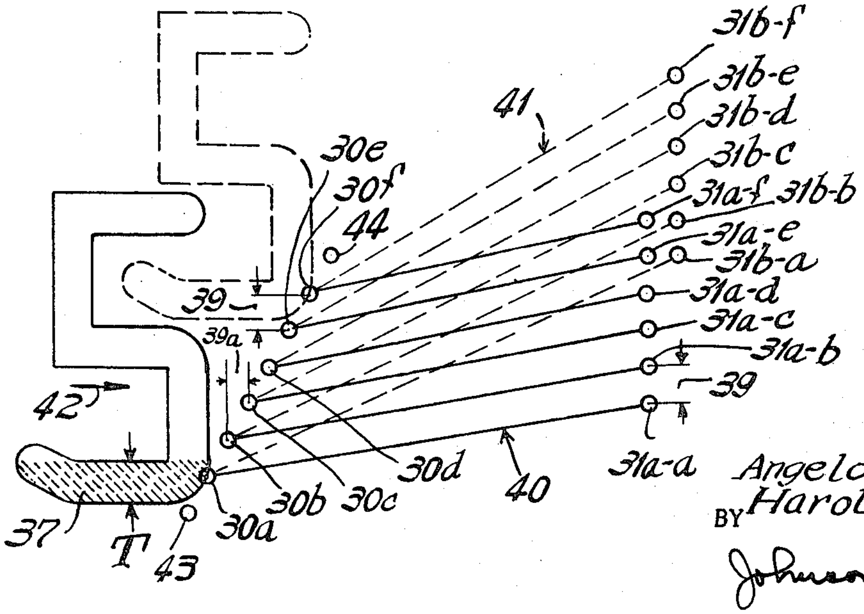
FIG. 3 is a pictorial illustration of the relationship between the registering elements and the reading elements together with a character's various locations with respect thereto.

Shown in FIG. 3 is a pictorial representation of two possible positions which a character may have in its path of movement with respect to the registering and reading elements. Each of the elements in the rows of reading elements 31*a* and 31*b* are spaced a distance apart perpendicular to the path of movement of the character, with the distance being indicated by the reference character 39 that is no more than and preferably slightly less than the thickness of a stroke indicated by the reference letter T. Moreover, as to the registering elements their perpendicular distance is the same as the reading elements and are thus also indicated by the reference character 39. The two distances are essentially equal and as shown most of the registering elements are aligned along the path of movement of the character with a reading element in the lower row. The particular spacing between the registering elements along the path of movement is indicated by reference numeral 39*a* and is at a minimum but no less than that required to cause the bottom portion of all characters in the set to be scanned first before the leading edge of the character is scanned by any other registering cell.

Shown in FIG. 3 is a character numeral 5 as its image appears to the sensing elements at the lowermost position or path of movement at which it can be errorlessly read and also fragments thereof are shown at the uppermost position in which it can be errorlessly read. At and between these two positions, the present system will read the character while, as will be hereinafter described, if the character is outside of these extremes a signal will be produced indicating that the character is not to be read or it is being read with error.

The registering elements 30 are individually indicated by reference numerals 30*a*, 30*b*, 30*c*, 30*d*, 30*e* and 30*f* and each, as will be shown on the schematic diagram, is electrically connected to one reading element in the lower row 31*a* and one element in the upper row 31*b*. The electrical connection or element in the upper row 31*b*. The electrical connection or relationship between the registering elements and the reading elements for the lower row are indicated by solid lines, such as lines 40, while the relationship for the elements of the upper row is indicated by the dotted lines 41. With the character in the lowermost position and moving rightwardly in the direction of the arrow 42, the leading edge of the bottom thickness 37 will encounter the registering element 30*a* before it encounters any other element which will, as indicated by the lines 40 and 41, actuate the lowermost element 31*a–a* in the lower reading group 31*a* and also the lowermost element 31*b–a* in the reading group 31*b*. It will be appreciated that as the character continues to move along its path of movement that the upper reading line and the lower reading line will become substantially aligned with these two elements thereby enabling the apparatus to be responsive to the selected upper and lower portions of the character.

On the other hand, if the character is in its uppermost position, the leading edge of the bottom thickness 37 will be initially scanned by the registering element 30*f* which will in turn, as indicated by the lines connected thereto, actuate the topmost reading elements 31*a–f* and 31*b–f* of the two rows. These two elements will be aligned with the upper and lower reading lines of the character as it moves thereunder to provide reading of the proper portions of the character.

At any intermediate position between the two extreme positions shown, one of the registering elements 30*b* through 30*e* will be actuated first by the leading edge of the bottom thickness and it in turn will cause the appropriate elements in the reading rows to be actuated to read along the reading lines of the character. From the above it will also be understood that the upper reading line and the lower reading line are spaced apart a distance which is essentially a full number multiple of the distance 39 and in the particular embodiment shown is four times this distance though if desired, the rows may be shifted relative to one another if required by the configurations of the characters in the set.

The registering elements 30 further include a lowermost element 43 and an uppermost element 44 which, as will be hereinafter explained are utilized to scan the leading edge of the bottom thickness and provide an indication that the character will move in a path that is outside the vertical range or ability of the reading elements to read the character.

The herein described embodiment discloses a specific number of elements and their relationship and the number is determined by the desired parameter of being able to read a character which can depart one quarter of its height downward from its middle position and one quarter of its height upward therefrom. This range may be increased by addition of more elements, if desired, so long as the relationships between the elements are maintained and also may be decreased by eliminating some elements.

Figure 4:
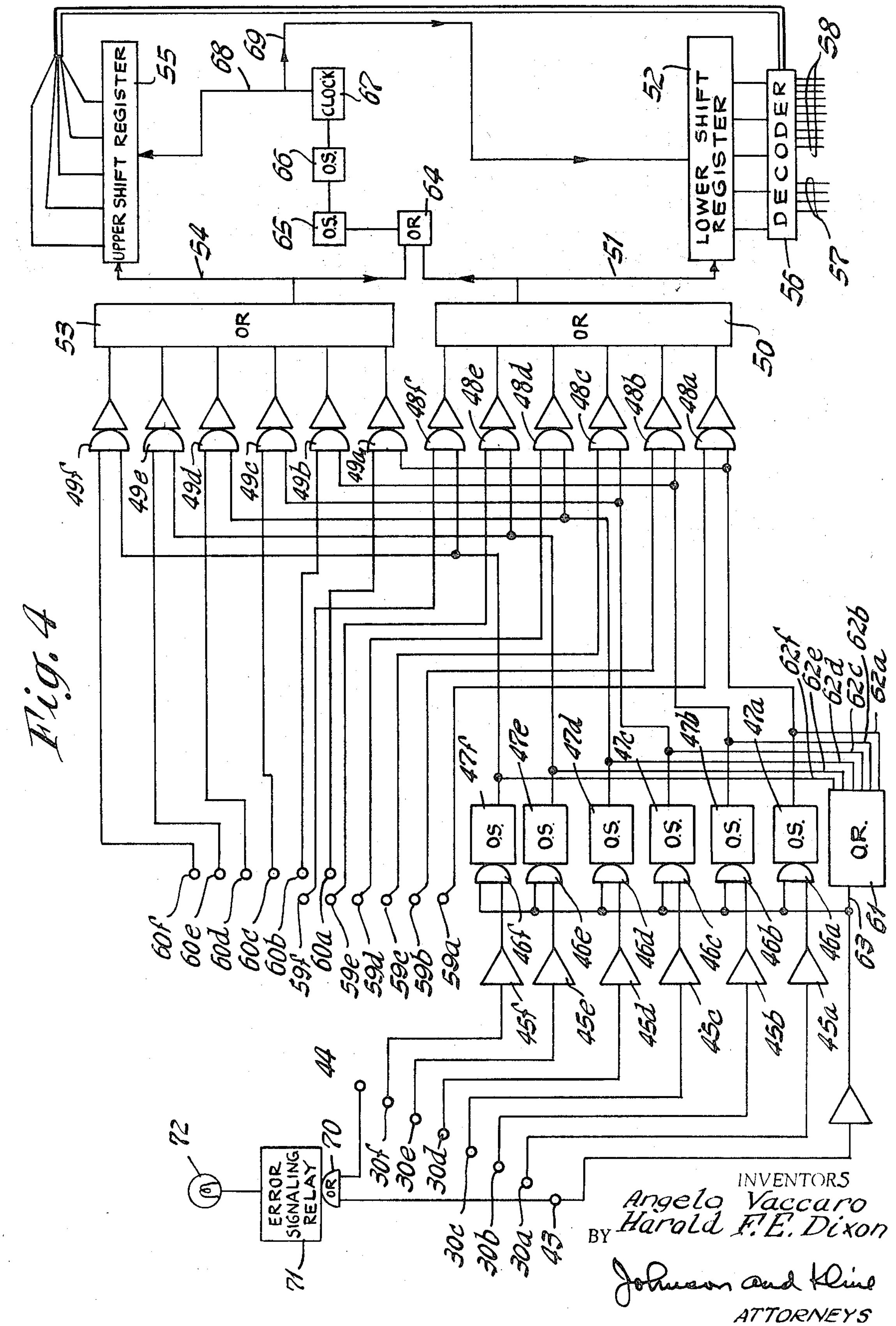
FIG. 4 is essentially a block diagram of the present apparatus.

Referring to the block diagram, FIG. 4, the registering elements are indicated by the same reference characters 30*a*–30*f* and each is connected through its own individual amplifier (45*a* through 45*f*) that receives the scan signal, i.e. a voltage level that is indicative of whether an element is scanning a low or high reflectivity portion and amplifies only a low reflectivity, black condition, to an input of an AND gate 46*a* through 46*f*. Each AND gate in turn has its output connected to the input of a monostable vibrator or "one-shot" 47*a* through 47*f*. Each of the outputs of the monostable vibrator is connected individually to the input of an AND gate 48*a* through 48*f* and also individually to an input of an AND gate 49*a* through 49*f* so that there are two AND gate inputs connected to the output of each one-shot 47*a*–47*f*. The output of each AND gate 48*a* through 48*f* is connected through an amplifier to an input or an OR gate 50 which in turn provides an output through the lead 51 to the initial stage of a lower shift register 52. Similarly the output of each AND gate 49*a* through 49*f* is amplified and supplied to an input of an OR gate 53 whose output appears on a lead 54 that is connected to the initial stage of an upper shift register 55. The binary representation caused by the actuated reading element that reads along the lower reading line 34 thus appears in the lower shift register 52 while the binary representation of the element which scans along the upper reading line 33 will appear in the upper shift register 55.

While these representations may be used directly, they are shown as being connected to a decoder 56 which may provide outputs on leads 57 of the usual binary representation of the numerical character read or along leads 58 which may be a decimal indication of the number.

The row of reading elements 31*a* is designated in this block diagram for convenience, 59*a* through 59*f* for 31*a*–*a* through 31*a*–*f* while the upper reading elements 31*b*–*a* through 31*b*–*f* are individually designated 60*a* through 60*f*. The reading element 59*a* is connected to the other input of the AND gate 48*a* and similarly the remaining reading elements 59*b* through 59*f* are each connected individually to the other inputs of the AND gates 48*b* through 48*f*. The upper reading elements are similarly each individually connected to the other inputs of the AND gates 49*a* through 49*f*. Accordingly, each element in the lower reading row is connected through its AND gate and amplifier to the OR gate 50 while each element in the upper reading row is connected through its AND gate and amplifier to the OR gate 53.

With the construction as heretofore described, in order for a read signal from any one of the reading elements to pass to its respective OR gate, it is essential that the AND gate associated with each reading element have a similar voltage level on its other input terminal. This other input terminal, as heretofore mentioned, is connected to the output of one of the vibrators 47*a* through 47*f* and in order to prevent information from any other reading cell except the pair that are aligned with the reading lines of the character from passing into the OR gates 50 and 53 there is provided an OR gate 61. This OR gate has a plurality of inputs 62*a* through 62*f* with each input being connected to the output of the AND gates 46*a* through 46F. With this circuit it will be understood that as soon as a signal appears from the output of any one of the multivibrators 47*a* through 47*f*, the lead 63 will change to a voltage level which is opposite to that which is applied by the amplifiers 45*a* through 45*f* when they scan a black portion of the character. Thus the first registering element that scans a black portion prevents the scanning of any other black portion by any other registering element from affecting its associated reading cells.

With a registering element having sensed the bottom portion of the leading edge of a character and provided a signal to one of the upper and lower AND gates 48*a*–48*f* and 49*a*–49*f* respectively while inhibiting passage of information through any of the other AND gates, the character continues its movement and passes beneath the reading elements. A black part of the character in the upper reading line will produce a low voltage level which is amplified, squared and passed into the OR gate 53 which in turn passes the information through the lead 54 to the initial stage of the shift register 55 to cause it to assume a 1 condition. For the lower reading line, a black portion will pass a low voltage level through the OR gate 50 into the initial stage of the shift register 52.

As heretofore noted, the character may effectively be subdivided into five vertical portions across its maximum width with a width being essentially equal to a stroke thickness. The apparatus stores the binary representation of the character when the middle of each segment is essentially being scanned. This is achieved by the use of an OR gate 64 that has its two inputs connected to the outputs of the OR gates 50 and 53. Upon the first voltage level occurring through either OR gate, the gate 64 passes the same to a one-shot multivibrator 65 which has its output connected to the trigger point of a second one-shot multivibrator 66. The one-shot 65 introduces a time delay before triggering the one-shot 66 which is substantially equal to the time required for one-half the stroke thickness to pass beneath a reading element. The actuation of the multivibrator 66 simultaneously actuates a clock 67 whose output on lead 68 and lead 69 consists of a series of pulses having a definite and constant time interval therebetween. This interval is equal to the time required for the width of a vertical portion to pass beneath a reading element. The one-shot multivibrator 66 is adjustable in time so that a triggering pulse will cause it to be maintained in its actuated state for a set time and after this interval, it automatically will return to its stable state. The interval is the time for five clock pulses to appear on the leads 68 and 69 and when the one-shot 66 returns to its stable state it stops the clock from functioning as the latter will only function when the vibrator 66 is in its unstable state.

The clock pulses on the leads 68 and 69 are directed to the shift input of the shift registers 55 and 42 respectively, and for each pulse the register will shift the state of each stage to a subsequent stage, it being understood that the initial stage will always become a 0 state simultaneously with the shifting.

Also shown in the block diagram are the endmost registering elements 43 and 44. These have their outputs connected through an OR gate 70 to a block 71 denoting an error signaling relay. The output of the relay 71 may perform any desired error signaling function, as for example energizing an error light 72, though, if desired, it may perform other functions such as directing the printed medium 22 into a reject container if appropriate mechanical medium handling devices are employed.

In the operation of the apparatus, when the support 23 moves the printed medium beneath the lens 25 at a definite rate the leading edge of the bottom portion of the character will actuate a first registering element which in turn will enable actuation of its associated reading element in the upper and lower group while preventing information from any other reading element to pass into its shift register. Each of the characters has a leading edge along either or both its upper and lower reading lines and when it is scanned by the reading elements, the clock 67 is actuated to produce five pulses after a time determined by the delay introduced by the one-shot vibrator 65. Each portion of the character that is white or of background material will have a 0 state stored in the shift register while each black portion will have a 1 state stored. The stored states may be used directly or decoded to other desired codes.

It will be understood that if it should occur that two registering elements should simultaneously become the first to sense the leading edge of the bottom portions of the characters, then both of the pairs of actuated reading cells will be able to read. However, the width of the upper and lower reading lines in which it is possible to read errorlessly is somewhat larger than the spacing 39 and thus the same information will be read by both pairs of reading cells, thereby not introducing error into the reading.

In the embodiment herein described, the registering elements scan the leading edge of a character and then the same character is subsequently read by the reading elements. The one-shot multivibrators 47*a*–47*f* each has the same settable time in which upon actuation they will retain their actuated or unstable state. With the registering and then scanning of the same character, this delay is set for the time required for the character to pass from the registering elements to the reading elements plus at least the time required to read. Thus the physical spacing between the registering elements and the reading elements on the image is less than the width of a character plus the width of the space between characters and the actuated time for the vibrators 47*a*–47*f* is set to be slightly less than the time required for the medium to move this distance.

While the above-described embodiment enables the apparatus to set the reading elements for each character, it has also been found that the actuated time of the one-shots 47*a*–47*f* may be set for the time required for a number of characters to pass beneath the reading elements. In many applications, a plurality of characters are formed on the medium in a line or row by a single printing device. One such device is a relatively rigid plastic credit card having a row of generally horizontally aligned characters which are capable of forming a row of printed characters that are aligned and without a vertcal displacement of one with respect to the other that would cause reading elements to faultlessly read some but not others. However, the row of characters on the medium is not sufficiently accurately placed on the medium with respect to a definite boundary or locating edge thereof. Thus by using the registering elements to select the reading elements that are aligned with the reading lines of the first character in the row, the remaining characters may be read by the same reading elements simply by the adjustment of the actuated time of the vibrators 47*a*–47*f*.

As shown in FIG. 8, it may be found desirable to register one character, i.e. indicated by the reference numeral 73, while reading the next character 74. This may be easily accomplished simply by inserting an additional one-shot 74*a*–74*f* in each of the output lines of the one-shots 47*a*–47*f* as shown in FIG. 9. Such a one-shot would have an actuation time the same as each of the one-shots 47*a*–47*f* while the latter would have a delay for the remainder of the time required to pass from the registering elements to the reading elements.

Figure 10:
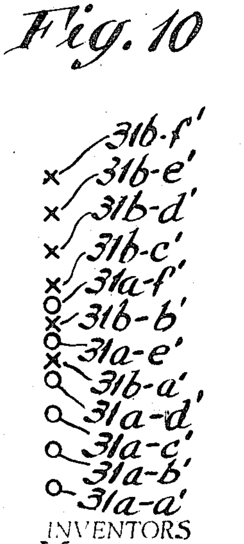
FIG. 10 is a pictorial illustration of another embodiment of the relative disposition of the reading elements.

Shown in FIG. 10 is another embodiment of the present invention in which the reading elements, while still disposed in two rows, have the rows aligned transversely to the path of the character rather than being somewhat spaced. In this manner the actuated reading element in the upper and lower row reading elements (indicated as 31*b*–*a'* to 31*b*–*f'* and 31*a*–*a'* to 31*a*–*f'* respectively) will read simultaneously rather than with a very slight interval therebetween. The elements in each row with respect to each other are spaced the same distance transversely of the character as in the heretofore described embodiment. However, the spacing between the rows is somewhat different. This will only effect the location of the upper reading line 33 which will be somewhat closer to the lower reading line.

It will accordingly be appreciated that there has been disclosed an apparatus that is capable of reading characters having a style which requires scanning along two reading lines. The character is aligned with a pair of reading elements that scan along these lines by the use of registering elements. The elements are positioned to scan the leading edge of a character prior to the reading elements in a sequential manner as it moves and use is made only of the registering element that first scans the character. As each registering element is connected to a reading element for each reading line, only those connected to the first actuated reading elements are permitted to have their scanning information translated into the output signal.

Variations and modifications may be made within the scope of the claims and portions of the improvements may be used without others.

We claim:

1. A character reading apparatus for providing an output signal unique to a character read that is formed on a medium with each character having a common portion leading edge comprising means for relatively moving the medium along a path, a plurality of reading elements positioned transversely to the path to scan the character and be responsive thereto produce a scan signal, a plurality of registering elements positioned transversely to the path, said elements being positioned prior in the path to the reading elements and located to sequentially scan for the common portion of the leading edge of the character with the common portion being that portion of the leading edge that is first scanned by the registering element, means connecting a registering element to at least one reading element, means connected to the reading elements for translating the scan signals into an output signal unique to the character and means for preventing scan signals caused by the character from all reading elements from being translated except for the reading element connected to the registering element that first scans the common portion of the leading edge of the character.

2. The invention as defined in claim 1 in which the reading elements are spaced apart and extend substantially perpendicularly to the path of movement and the registering elements are aligned and spaced apart to extend at an angle to the path of movement.

3. The invention as defined in claim 2 in which the registering means extends perpendicularly to the path of movement a distance that is less than the effective height of the character.

4. The invention as defined in claim 1 in which the common edge portion is the bottommost portion of the character.

5. The invention as defined in claim 1 in which the character is formed of strokes having a common thickness and the effective distance between each registering element perpendicularly to the path of movement is less than the thickness of the stroke being scanned.

6. The invention as defined in claim 1 in which the reading elements consist of two rows of aligned spaced elements, said rows being parallel and overlapping at least for a portion of the path and in which each registering element is connected to a pair of reading elements with one reading element being in one row and the second reading element being in the other row.

7. The invention as defined in claim 1 in which there are at least two characters formed on the printed medium in substantial alignment with the path of movement and in which the means for preventing includes timing means for maintaining the preventing means operative until both characters have been scanned by the reading means.

8. The invention as defined in claim 1 in which the apparatus includes additional registering elements that are positioned to be initially or finally actuated by the common portion of the leading edge with respect to the first mentioned registering elements and error indicating means connected to the additional registering elements to be actuated upon actuation of either of said additional registering elements.

References Cited

UNITED STATES PATENTS 3,243,776 3/1966 Abbott et al. ______ 340—146.3

THOMAS A. ROBINSON, Primary Examiner